United States Patent [19]

Golant et al.

[11] 3,879,690

[45] Apr. 22, 1975

[54] DISTRIBUTED TRANSMISSION LINE FILTER

[75] Inventors: Benjamin Golant, Maple Shade; Norman Richard Landry, Willingboro, both of N.J.

[73] Assignee: RCA Corporation, New York, N.Y.

[22] Filed: May 6, 1974

[21] Appl. No.: 467,137

[52] U.S. Cl. ............ 333/73 S; 333/84 M; 333/84 R

[51] Int. Cl. .......................... H01p 1/20; H01p 3/08

[58] Field of Search .... 333/73 R, 73 S, 84 M, 84 R, 333/73 C

[56] References Cited

UNITED STATES PATENTS 2,915,716 12/1959 Hattersley .................... 333/84 M X

*Primary Examiner*—James W. Lawrence

*Assistant Examiner*—Marvin Nussbaum

*Attorney, Agent, or Firm*—Edward J. Norton; Joseph S. Tripoli

[57] ABSTRACT

An undesired resonance is prevented in a distributed transmission line filter comprising a center conductor having serially connected inductive and capacitive sections separated from a ground conductor by a dielectric substrate having a first thickness for filter inductive sections and a second thickness for at least one of filter capacitive sections.

7 Claims, 3 Drawing Figures

DISTRIBUTED TRANSMISSION LINE FILTER

BACKGROUND OF THE INVENTION

1. Field of the Invention

The present invention relates to microwave filters and more particularly to microwave filters having distributed transmission line sections.

2. Description of the Prior Art

Microwave filters having distributed sections of transmission line dimensioned to approximate a predetermined arrangement of inductors and capacitors providing a frequency pass-band and stop-band are well known in the art. It is desired that signals in the frequency pass-band be propagated through the filter with relatively low insertion loss or attenuation, while signals in the frequency stop-band are attenuated by the filter. However, if a filter section dimension approaches a resonant electrical length at a frequency, $f_r$, within the stop-band, an undesired resonant condition exists which permits signal propagation through the filter with relatively low insertion loss at frequency $f_r$.

A prior art solution to the problem of filter band-stop resonances is to substitute a relatively small dimensioned lumped element such as a capacitor chip for a larger distributed transmission line capacitor section. Such a solution is not possible at relatively high microwave frequencies where fabrication of operable lumped elements is difficult.

SUMMARY OF THE INVENTION

According to the invention, a filter apparatus is provided which includes a plurality of inductive and capacitive sections arranged to provide predetermined frequency pass-bands and stop-bands in response to an input signal. The filter apparatus comprises an electromagnetic transmission line having a ground conductor on one surface of a dielectric substrate and a center conductor on a dielectric substrate surface opposite the one substrate surface. The center conductor has a plurality of serially connected sections dimensioned to approximate the arrangement of inductive and capacitive sections which provides the frequency pass-bands and stop-bands in response to the input signal. A first spacing is provided between the center conductor inductive sections and the ground conductor. A second spacing is provided between at least one of the center conductor capacitive sections and the ground conductor to prevent the one center conductor capacitive section being resonant in the frequency stop-band.

DESCRIPTION OF THE PREFERRED EMBODIMENT

Figure 1:
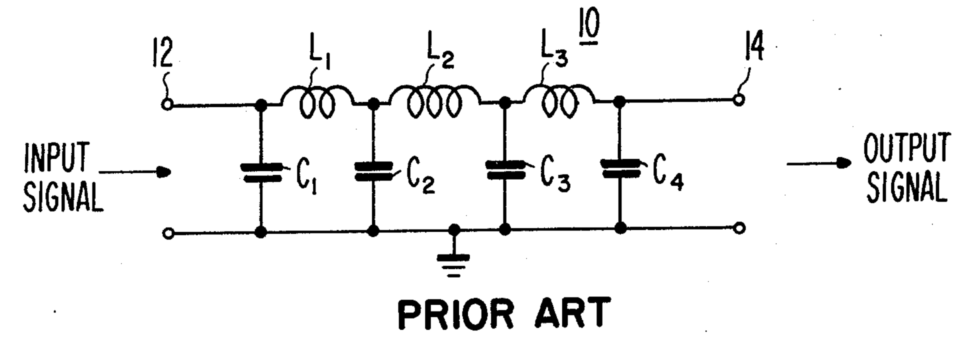
FIG 1 is a schematic diagram of a prior art low-pass filter.

Referring to FIG. 1, there is shown a schematic of a prior art low-pass filter 10 comprising an arrangement of relatively low impedance elements (capacitors $C_1$, $C_2$, $C_3$ and $C_4$) alternating with relatively high impedance elements (inductors $L_1$, $L_2$ and $L_3$). Low-pass filter 10 is intended only as an illustration of a filter having a pass-band and stop-band and not as a limitation of the invention described below. Signals at frequencies below or less than a desired filter cutoff frequency, $f_2$, are within a predetermined frequency passband and these pass-band signals are transmitted with little attenuation from input terminal 12 to output terminal 14. In addition to transmitting signals within a frequency passband, filter 10 is arranged to attenuate signals at frequencies which exceed the cutoff frequency $f_c$. The attenuated signals are at frequencies within a frequency stop-band. The magnitudes of capacitive elements $C_1$, $C_2$, $C_3$ and $C_4$ and inductive elements $L_1$, $L_2$ and $L_3$ are dependent on the desired cutoff frequency, $f_c$, and the desired pass-band and stop-band attenuations. A method for determining the capacitive and inductive elements of low-pass filter 10 is further described in Chapter 4 of "Microwave Impedance-Matching Networks, and Coupling Structures" by Matthaei, et al., published by McGraw-Hill Inc.

Figure 2:
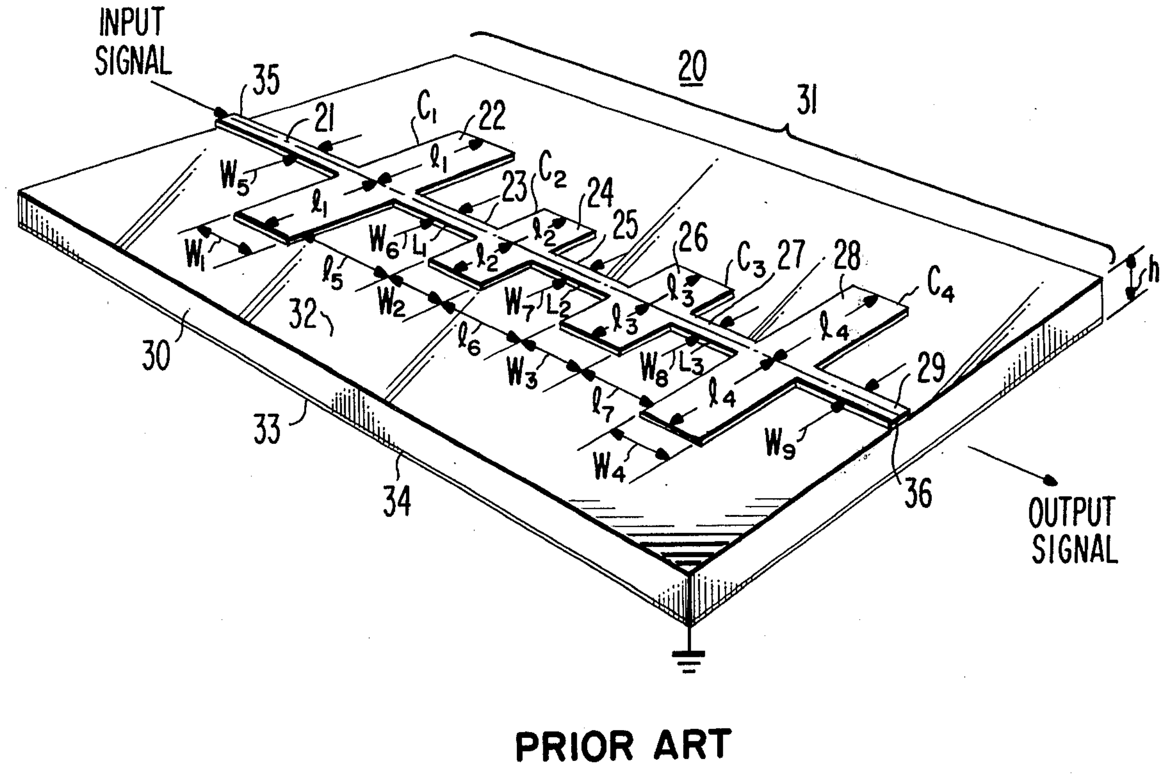
FIG. 2 is an isometric view of a prior art microstrip transmission line low-pass filter.

Referring to FIG. 2, there is shown an isometric view of a prior art microstrip transmission line low-pass filter 20 operable at microwave frequencies. Low-pass filter 20 comprises a dielectric substrate 30 having a first conductive strip 31 or center conductor on one substrate surface 32 and a second conductive strip 33, at a reference or ground potential, on an opposite substrate surface 34. Electric fields, not shown, of a microwave input signal coupled to filter input terminal 35 are confined substantially within dielectric substrate 30 between conductive strips 31 and 33, thereby providing a transmission path for electromagnetic energy between input terminal 35 and output terminal 36.

Conductive strip 31 is arranged to have serially connected distributed transmission line sections 22, 23, 24, 25, 26, 27 and 28 having impedance magnitudes substantially equal to the impedance magnitudes presented by the capacitive and inductive elements of filter 10 (FIG. 1) at frequency $f_c$. For example, sections 22, 24, 26, and 28 are dimensioned to approximate the capacitance of elements $C_1$, $C_2$, $C_3$ and $C_4$, respectively, in FIG. 1 and sections 23, 25 and 27 are dimensioned approximate the inductance of elements $L_1$, $L_2$ and $L_3$ respectively, in FIG. 1.

The dimensions for sections 22, 24, 26 and 28 for providing a predetermined relatively low impedance or capacitive reactance, $X_C$, at frequency $f_c$ are determined by:

$$X_C = -j2 \quad [Z_o \cot \frac{2\pi l}{\lambda}] \quad \text{ohms} \qquad (1)$$

where $Z_o$ is the characteristic impedance of the respective transmission line sections, $\lambda$ is the transmission line wavelength at cutoff frequency $f_c$, and $l$ is a section length from section center to an open circuited end ($l_1$, $l_2$, $l_3$ or $l_4$). It should be apparent from equation (1) that respectively different magnitudes for $C_1$, $C_2$, $C_3$ and $C_4$ in FIG. 1, may require respectively different dimensions for each of sections 22, 24, 26 and 28.

The dimensions for sections 23, 25 and 27 for providing a predetermined relatively high impedance or inductive reactance, $X_L$, at frequency $f_c$ is determined by:

$$X_L = +j\, 2\pi f Z_o l \sqrt{\mu\epsilon} \qquad (2)$$

where $Z_o$ is the characteristic impedance of the respective transmission line sections, $f$ is the cutoff frequency, $f_c$, $\mu$ is the magnetic permeability of dielectric substrate 30, $\epsilon$ is the dielectric constant of dielectric substrate 30 and $l$ is a section length ($l_5$, $l_6$ or $l_7$). It should be further apparent from equation (2) that respectively different magnitudes for $L_1$, $L_2$ and $L_3$ in FIG. 1 may require respectively different dimensions for each of high impedance sections 23, 25 and 27.

As known in the prior art, the characteristic impedance $Z_o$, of a microstrip transmission line is determined by the width, $w$, of the conductive strip, the relative dielectric constant, $\epsilon_r$, of dielectric substrate 30 and the thickness, $h$, of dielectric substrate 30. A method for determining the characteristic impedance, $Z_o$, of a microstrip transmission line and microstrip transmission line wavelength is described in "Measurements on the Properties of Microstrip Transmission Lines for Microwave Integrated Circuits" by M. Caulton, et al., published in the RCA Review, September 1966, Vol. XXVII, No. 3.

A problem frequently encountered in the use of prior art microwave filters having distributed transmission line sections is an undesirable filter resonance caused by a filter section dimension approaching a resonant length. In particular, distributed transmission line low-pass filters provide relatively little signal attenuation at a frequency within the filter stop-band in response to an undesired stop-band resonance. The undesired filter resonance is produced in response to a signal at a frequency, $f_r$, at which a filter section dimension (length, $l$, or width, $w$) approaches an electrical length of substantially $\lambda/4$ or multiple thereof, where $\lambda$ is the transmission line wavelength at frequency $f_r$. For example, in filter section 22 a first stop-band resonance may be produced at a frequency, $f_{r1}$, where section dimension $w_1$ or $l_1$ approaches an electrical length of substantially $\lambda/4$ where $\lambda$ is the transmission line wavelength at frequency $f_{r1}$. In addition, a second stop-band resonance may be produced at a second frequency, $f_{r2}$, where the dimension, $l_5$, of filter section 23 approaches an electrical length of substantially $\lambda/2$ or a multiple thereof where $\lambda$ is the transmission line wavelength at frequency $f_{r2}$.

Figure 3:
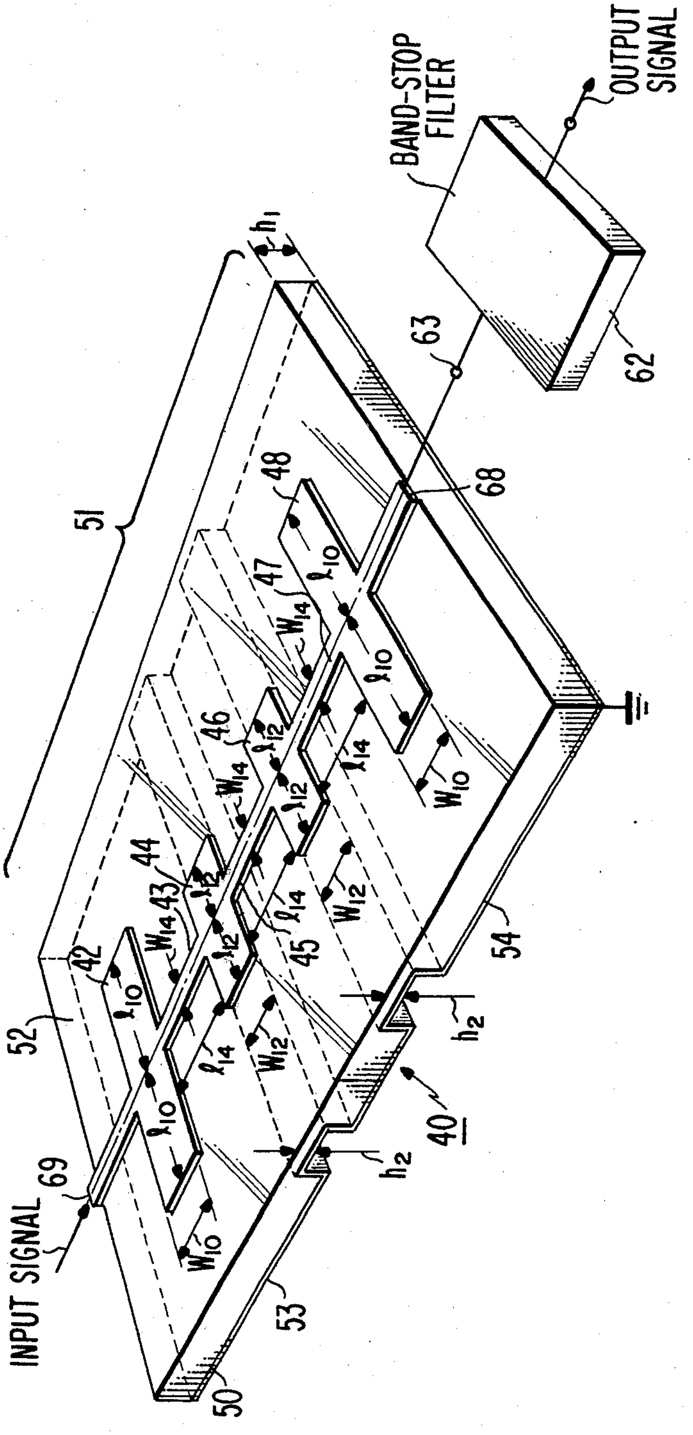
FIG. 3 is an isometric view of a microstrip transmission line low-pass filter according to the invention.

Referring to FIG. 3, there is shown an isometric view of a microstrip transmission line low-pass filter 40 operable at microwave frequencies according to the invention. Low-pass filter 40 comprises a dielectric substrate 50 having a first conductive strip 51 or center conductor on one substrate surface 52 and a second conductive strip 53, at a reference or ground potential, on a opposite substrate surface 54. Conductive strip 51 is arranged to have serially connected sections 42, 43, 44, 45, 46, 47 and 48. The dimensions of sections 42, 44, 46 and 48 are chosen to approximate the capacitance of elements $C_1$, $C_2$, $C_3$ and $C_4$, respectively, in FIG. 1. However, unlike prior art sections 22, 24, 26 and 28, described in relation to FIG. 2, the dimensions of sections 44 and 46 prevent undesired resonance in the filter stop-band by increasing the relative capacitance per unit area of sections 44 and 46. Means for increasing the capacitance per unit area of sections 44 and 46 relative to the capacitance per unit area of sections 22, 24, 26 and 28 are described below following a description of sections 43, 45 and 47.

Sections 43, 45 and 47 are dimensioned to provide a relatively high magnitude of impedance. Unlike the prior art sections 23, 25 and 27 shown in FIG. 2, having different lengths $l_5$, $l_6$ and $l_7$, capable of producing multiple stopband resonances, each of sections 43, 45 and 47 have the same length $l_{14}$. Thus, sections 43, 45 and 47 are dimensioned to permit a resonance at a single stop-band frequency $f_1$. Compensation for the resonant condition or lack of stop-band attenuation due to section length $l_{14}$ is provided by a prior art band-stop filter 62, resonant at $f_1$, and coupled to low-pass filter output terminal 68.

By way of illustration and not limitation, it is desired that filter 40 have a cutoff frequency, $f_c$, at 2.0 GHz, a pass-band attenuation of 0.5 db and a stop-band attenuation of 50 db from 2.5 GHz to 12.4 GHz. From the procedure described in Chapter 4 of "Microwave Filters, Impedance-Matching Networks, and Coupling Structures," supra, it is determined that the capacitance of sections 42 and 48 be 0.856 pico-farads and the capacitance of sections 44 and 46 be 3.47 pico-farads. Microstrip transmission line impedance and parallel plate capacitance per unit area of transmission line are inversely proportional to dielectric substrate thickness, $h_1$ and $h_2$. Thus, by chossing dielectric substrate thickness, $h_1$, to provide a relatively high capacitance per unit area and a relatively low impedance magnitude for sections 42 and 48, the dimensions, $l_{10}$ and $w_{10}$ of sections 42 and 48 respectively are small relative to a section 42 and 48 transmission line wavelength. The dimensions $l_{10}$ and $w_{10}$ of sections 42 and 48 are determined from equation (1), where the relative dielectric constant of substrate 50 is substantially 9.9 and the substrate thickness, $h_1$, between conductive strip sections 42 and 48 and ground conductor 53 is substantially 0.050 inches. The length $l_{10}$ of each of sections 42 and 48 is substantially 0.110 inches and the width $w_{10}$ of each of sections 42 and 48 is substantially 0.100 inches. Thus, by choosing a suitable dielectric substrate thickness, $h_1$, of 0.050 inches, for sections 42 and 48, section dimensions $l_{10}$ and $w_{10}$, are very small compared to a section 42 and 48 transmission line wavelength at the highest frequency of the desired band-stop bandwidth and resonances caused by dimensions $l_{10}$ and $w_{10}$ will occur at frequencies outside the band-stop bandwidth.

The dimensions of sections 44 and 46 are determined from equation (1), where the substrate thickness, $h_2$, between conductive strip sections 44 and 46 and ground conductor 53 is substantially 0.010 inches. The length $l_{12}$ of sections 44 and 46 is substantially 0.080 inches and the width, $w_{12}$, of sections 44 and 46 is substantially 0.100 inches. A suitable dielectric substrate thickness of 0.010 inches for sections 44 and 46 permits section dimensions $l_{12}$ and $w_{12}$ to be very small compared to a section 44 and 46 transmission line wavelength at the highest frequency of the desired band-stop bandwidth and resonances caused by dimensions $l_{12}$ and $w_{12}$ will occur at frequencies outside the band-stop bandwidth. Thus, means for increasing the capacitance per unit area of sections 44 and 46 relative to the capacitance per unit area of sections 42 and 48, for example, include undercutting or decreasing substrate 50 thickness from 0.050 inches under sections 42 and 48 to 0.010 inches under sections 44 and 46.

Unlike the prior art, the impedance or inductance of sections 43, 45 and 47 are chosen substantially equal to each other and electrically combine or react with the capacitive reactance of sections 42, 44, 46 and 48 to provide relatively low signal attenuation in the pass-band and relatively high signal attenuation in the stop-band. Since the inductance of sections 43, 45 and 47 substantially equal each other, the dimensions $w_{14}$ and $l_{14}$ of sections 43, 45 and 47 are substantially equal. Thus, sections 43, 45 and 47 permit a resonance at a single stop-band frequency $f_1$. As an example, the inductance of sections 43, 45 and 47 is chosen to be 6 nano-henries. The dimensions of sections 43, 45 and 47 are determined from equation (2) where the substrate thickness, $h_1$, between conductive strip sections 43, 45 and 47 and ground conductor 53 is substantially 0.050 inches. The length, $l_{14}$, and width, $w_{14}$, of sections 43, 45 and 47 is 0.280 inches and 0.010 inches respectively.

The length, $l_{14}$, of sections 43, 45 and 47 permits a resonance or relatively little attenuation within the stop-band at 7.0 GHz. As previously discussed, means for compensating for the lack of attenuation at 7.0 GHz include connecting input terminal 63 of a suitable band-stop filter 62 resonant at 7.0 GHz to low-pass filter output terminal 68. If needed, band-stop filter 62 can be arranged, as known in the art, to match or tune the impedance of low-pass filter 40, thereby optimizing the voltage standing wave ratio at low-pass filter input terminal 69. A suitable band-stop filter 62 is further described in Chapter 12 of "Microwave Filters, Impedance-Matching Networks, and Coupling Structures," supra.

A preferred embodiment of the invention has been shown and described. Various other embodiments and modifications thereof will be apparent to those skilled in the art. For example, the disclosed concept of a low-pass filter having a relatively wide-stop band need not be limited to applications in microstrip transmission line or, indeed, to low-pass filters. It is intended that the invention be applicable to other filter types such as band-pass and band-stop filters having sections dimensioned to approximate a predetermined arrangement of inductors and capacitors for providing a frequency pass-band and stop-band

What is claimed is:

1. Filter apparatus having a plurality of inductive and capacitive sections arranged to provide predetermined frequency pass-bands and stop-bands in response to an input signal, comprising:

an electromagnetic transmission line having a ground conductor on one surface of a dielectric substrate and a center conductor on a dielectric substrate surface opposite said one surface, said center conductor having a plurality of serially connected sections dimensioned to approximate said arrangement of said inductive and capacitive sections for providing said frequency pass-bands and stop-bands in response to said input signal;

means for providing a first spacing between said center conductor inductive sections and said ground conductor; and means for providing a second spacing between at least one of said center conductor capacitive sections and said ground conductor to prevent said one center conductor capacitive section being resonant in said frequency stop-band.

2. Filter apparatus according to claim 1, wherein said plurality of inductive sections have substantially equal dimensions.

3. Filter apparatus according to claim 1, wherein said electromagnetic transmission line is microstrip transmission line.

4. Filter apparatus according to claim 1, wherein said serially connected center conductor sections are arranged to approximate a low-pass filter.

5. Apparatus having input terminals and output terminals and a predetermined arrangement of inductive and capacitive sections, comprising:

an electromagnetic transmission line having a ground conductor on one surface of a dielectric substrate and a planar center conductor on a dielectric substrate surface opposite said one surface, said center conductor having a plurality of serially connected sections dimensioned to approximate said arrangement of said inductive and capacitive sections;

means for providing a first spacing between said center conductor inductive sections and said ground conductor, said inductive sections having substantially equal dimensions and being resonant at frequency $f_1$; and means for providing a second spacing between at least one of said center conductor capacitive sections and said ground conductor to prevent an undesired resonance of said one center conductor capacitive section.

6. Apparatus according to claim 5, further including means connected to said output terminal for attenuating signals at said frequency $f_1$.

7. Apparatus according to claim 6, wherein said attenuating means is a band-stop filter resonant at said frequency $f_1$.

* * * * *

UNITED STATES PATENT OFFICE

CERTIFICATE OF CORRECTION

PATENT NO. : 3,879,690

DATED : April 22, 1975

INVENTOR(S) : Benjamin Golant, et al.

It is certified that error appears in the above-identified patent and that said Letters Patent are hereby corrected as shown below:

After ABSTRACT paragraph, add a new paragraph as follows:

--The invention herein described was made in the course of or under a contract or subcontract thereunder with the Department of the Army.--

Column 2, line 2, "$f_2$" should be --$f_c$--

Signed and Sealed this

*tenth* Day of *February 1976*

[SEAL]

*Attest:*

RUTH C. MASON
*Attesting Officer*

C. MARSHALL DANN
*Commissioner of Patents and Trademarks*